Patented Aug. 4, 1953

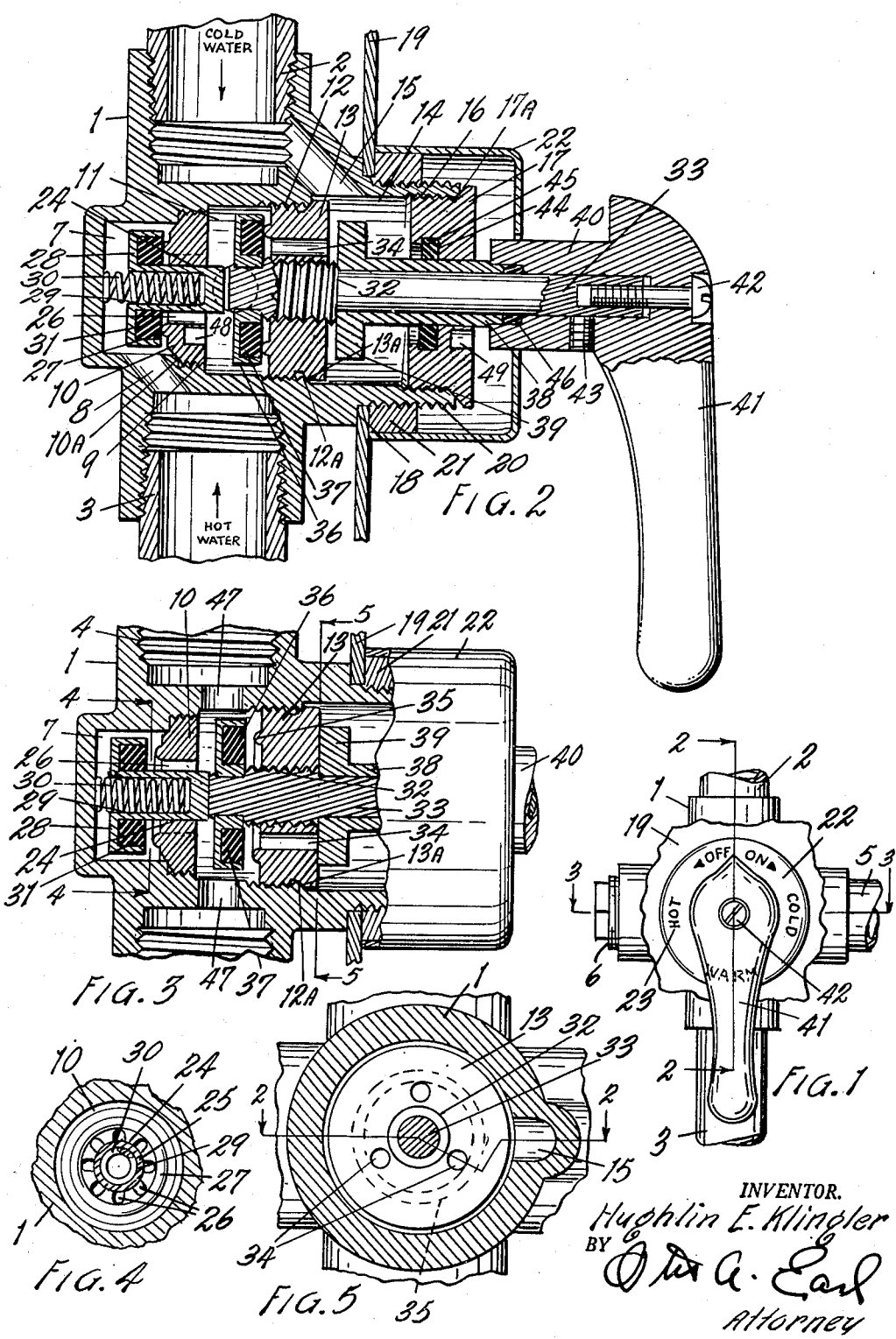

2,647,537

UNITED STATES PATENT OFFICE 2,647,537

MIXING VALVE

Hughlin E. Klingler, Elkhart, Ind.

Application June 14, 1950, Serial No. 168,099

13 Claims. (Cl. 137—630.16)

This invention relates to improvements in a mixing valve.

The principal objects of this invention are:

First, to provide a novel mixing valve for selectively controlling the mixture of two liquids, such as hot and cold water, which valve is so constructed and arranged that all parts subject to wear or deterioration may be removed from the valve body for replacement or repair without demounting the valve body from its support or connections.

Second, to provide a mixing valve in which the operating valve stem is constantly surrounded by a supply of cold water to prevent overheating of the valve stem and handle even though the valve may be opened to pass only hot water.

Third, to provide a mixing valve having a double acting cold water valve to positively shut off the cold water in the closed position of the valve and to variably regulate the flow of cold water in open positions of the valve.

Fourth, to provide a control valve in which a single removable element forms two alternately acting valve seats with flow passages therebetween and an operating connection and guide for a valve stem and valve elements cooperative with the valve seats.

Fifth, to provide a mixing valve, for showers, sinks and the like, having full flow capacity for both hot and cold water and which is small and compact to require only a small space behind its supporting panel.

Sixth, to provide a novel form of valve having removable seats that are tightly sealable to the valve body when installed.

Other objects and advantages relating to details of my valve will be apparent from a consideration of the following description and claims. The drawings, of which there is one sheet, illustrate a preferred form of my valve.

Fig. 1 is a front elevational view of my valve as operatively installed on a supporting panel and connected to supply and discharge pipes.

Fig. 2 is a vertical cross sectional view through the valve taken along the plane of the line 2—2 in Figs. 1 and 5.

Fig. 3 is a horizontal cross sectional view through the valve taken along the plane of the line 3—3 in Fig. 1.

Fig. 4 is a fragmentary cross sectional view through the hot water inlet chamber of the valve taken along the plane of the line 4—4 in Fig. 3.

Fig. 5 is a fragmentary cross sectional view through the cold water inlet chamber of the valve taken along the plane of the line 5—5 in Fig. 3.

The construction and operation of my valve is best explained and understood by first considering the construction of the valve body indicated generally at 1 and formed as a forging or casting in cruciform shape. The branches of the cruciform body are bored and taped to provide a cold water inlet connection 2 at the top of the body and a hot water inlet connection 3 at the bottom of the body. The side branches of the body, as viewed in the drawings, form duplicate or alternative delivery connections 4 which may be selectively connected to a delivery pipe 5 or closed by a plug 6 as shown in Fig. 1.

The center of the body is bored and counterbored along an axis normal to the plane of the arms of the body. As is most clearly illustrated in Figs. 2 and 3, the first or inner bore forms a hot water inlet chamber 7 which communicates with the hot water supply connection 3 through a radial passage 8. Forwardly of the hot water inlet chamber the bore in the body is enlarged from a sharp annular shoulder and threaded as at 9 to receive a hot water valve seat 10. The inner end of the valve seat 10 has a conical face 10A which seals against the shoulder on the body. Still further forwardly of the hot water valve seat 10 the bore is enlarged to form a mixing chamber 11 and the forward end of the mixing chamber is internally threaded as at 12 to receive the cold water valve seat 13. Forwardly of the threads 12 the body is sharply shouldered as at 12A and the cold water valve seat has a conical surface 13A sealing against the shoulder 12A. Forwardly of the cold water valve seat and the shoulder 12A the bore forms a cold water inlet chamber 14 communicating with the cold water supply connection 2 through the inclined and radially extending passage 15. The forward end of the cold water inlet chamber is internally threaded as at 16 to receive the packing nut 17. The packing nut 17 has a conical surface 17a sealing against the forward edge of the bore.

The exterior of the forward end of the valve body is annularly shouldered as at 18 to be received in a supporting panel 19 and is externally threaded as at 20 to receive a clamping nut 21 for securing the body to the supporting panel. A cup shaped escutcheon or housing 22, which may have operating indicia printed on the front side thereof as at 23 in Fig. 1, has a tight sliding fit on the exterior of the nut 21.

The hot water valve seat 10 is centrally bored as at 24 to form a guide for the hot water valve stem 25. The hot water valve seat is further bored or recessed around the valve stem guide to form a series of angularly spaced hot water passages 26 opening through the valve seat. In order to reduce the diameter of the valve seat the passages may intersect and open to the valve guide passage as shown. An annular rib 27 formed on the rear face of the hot water valve seat around the passages 26 forms the actual valve engaging portion of the valve seat.

The hot water valve stem 25 is integrally formed with a valve plate 28 and is axially bored as at 29 to receive the forward end of a spring 30. The plate 28 is recessed on its forward side to receive the rubber or other deformable gasket 31 and the rear end of the spring 30 bears against the inner end of the hot water inlet chamber to constantly urge the hot water valve against the hot water valve seat. It will be noted that the forward end of the valve stem 25 projects substantially through the hot water valve seat and into the mixing chamber 11.

The cold water valve seat 13 is centrally bored and threaded as at 32 to receive the threaded portion of the regulating valve stem 33. The cold water valve seat is further bored to form the angularly spaced cold water passages 34 opening between the cold water inlet chamber 14 and mixing chamber 11. An annular rib 35 surrounding the inner ends of the passages 34 forms a shut-off seat cooperative with the cold water shutoff valve 36 carried on the inner end of the valve operating stem 33. The cold water shutoff valve desirably has an annular seating gasket 37 of rubber or other deformable material. It is particularly pointed out that when the cold water shut-off valve is closed as shown in Fig. 2 that the inner end of the valve operating stem 33 is spaced from the outer end of the hot water valve stem 25 so that the hot water valve 28 will also be closed under the influence of the spring 30.

Slidably mounted around the operating valve stem 33 and seating against the threaded portion thereof is a sleeve 38 having a radially projecting collar 39 on its inner end which forms a cold water control valve cooperative with the outer ends of the cold water passages 34. The sleeve 38 and cold water control valve are moved axially inwardly with the valve control stem by reason of the hub 40 of the operating handle 41 bearing against the outer end of the sleeve 38. The handle 41 is axially secured to the operating stem by the screw 42 and is held against rotation about the stem by a setscrew 43.

The packing nut 17, which closes the forward end of the cold water inlet chamber, embraces the sleeve 38 and is provided on its inner face with an enlarged and annularly shouldered recess 44 for receiving the packing gasket 45. The gasket 45 is rubber and is squeezed into the recess to expand into sealing engagement with the sleeve 38. A small gasket 46 is clamped between the outer end of the sleeve 38 and the end of a recess in the hub 40 to prevent the leakage of water along the operating stem 33.

Water entering the mixing chamber 11 through either the hot water ports 26 or the cold water ports 34 is mixed and delivered through the delivery ports 47 opening to the outlet connections 4 of the body. The first inward movement of the control stem 33 unseats the cold water shutoff valve 36—37 and permits the flow of cold water to the mixing chamber. Thereafter the amount of cold water passed through the valve is under the control of the cold water regulating valve 39 which reduces the flow of cold water as it approaches the forward face of the cold valve seat.

Further inward motion of the control stem 33 engages the outer end of the hot water valve stem 25 and progressively opens the hot water valve 28—31 to increase the proportion of hot water admitted to the mixing chamber until substantially all of the water passing through the valve is hot water. It should be noted that the operating valve stem 33 and the cold water control valve 39 are continually surrounded with a supply of cold water so that even if the valve is adjusted to pass only hot water for a considerable period of time the operating stem 33 and handle 41 will not become uncomfortably heated.

All of the movable elements of the valve and the valve seats are easily removable from the front of the valve body for repair or replacement without removing the valve body from its connecting pipes and the valve is thus easily serviced. For this purpose the hot water valve seat is provided with wrench receiving holes 48 (see Figs. 1 and 3) on its forward face and the packing nut 17 is provided with similar holes 49. The holes 48 and 49 are arranged in the same pattern as the cold water passages 34 in the cold water valve seat so that the cold water passages will also serve as wrench holes for receiving the pins on a wrench designed to fit the holes 48 and 49.

Having thus described my invention, what I claim as new and desire to secure by Letters Patent is:

1. A mixing valve comprising, a body having a bore formed therein closed at one end and opening to one face of the body, two fluid supply connections and a discharge connection formed around the edge of said body, said bore having an outer portion forming a first inlet chamber internally threaded at its outer end and communicating through a radially and angularly extending passage with one of said supply connections, said bore having an inwardly shouldered first reduced portion at the inner end of said first chamber and internally threaded at its outer end and forming a mixing chamber, said mixing chamber communicating through a radial passage with said discharge connection, said bore further having an internal thread formed at the inner end of said mixing chamber and an inner portion of reduced diameter with a shoulder at the inner end of said third thread and forming a second inlet chamber communicating through a radially and angularly extending passage with the second of said inlet connections, a first valve seat disc threadedly engaged with the thread at the outer end of said mixing chamber and forming a central threaded aperture and fluid passages disposed around said threaded aperture, an operating valve stem threadedly engaged in the aperture in said first valve seat and having a shutoff valve on the inner end thereof cooperative with the inner face of said first valve seat, a sleeve positioned around the outer end of said stem and having a regulating valve flange cooperative with the outer face of said first valve seat, a second valve seat threadedly engaged with the threads at the inner end of said mixing chamber and forming a central valve stem guide with fluid passages disposed therearound, the outer face of said inner valve seat having wrench receiving recesses formed therein in the same pattern as the fluid passages in said first valve seat, a second valve stem slidably supported in the guide in said second valve seat and projecting therethrough to adjacent the inner end of said operating valve stem, a spring recessed into the inner end of said second valve stem and bearing against the inner end of said bore, a second shutoff valve on the inner end of said second valve stem cooperative with the inner face of said second valve seat, said valve seats having inwardly facing conical portions adjacent the threads thereon cooperative with the inwardly shouldered portions of said bore to seal thereagainst, a packing plug in the outer end of said body and having a conical surface sealingly engaged with the outer end of said bore, the inner face of said plug having an annular shouldered recess formed therein with an annular gasket retained in said recess and sealingly embracing said sleeve, the outer face of said plug having wrench receiving recesses formed therein in the same pattern as said first wrench receiving recesses, a handle axially clamped to the outer end of said operating stem and secured against rotation thereon, and a sealing gasket clamped between the inner end of said handle and the outer end of said sleeve around said operating stem, the forward end of said body being externally threaded and adapted to be clamped to a supporting panel by a nut threaded thereon.

2. A mixing valve comprising, a body having a bore formed therein closed at one end and opening to one face of the body, two fluid supply connections and a discharge connection formed around the edge of said body, said bore having an outer portion forming a first inlet chamber internally threaded at its outer end and communicating through a radially and angularly extending passage with one of said supply connections, said bore having an inwardly shouldered first reduced portion at the inner end of said first chamber and internally threaded at its outer end and forming a mixing chamber, said mixing chamber communicating through a radial passage with said discharge connection, said bore further having an internal thread formed at the inner end of said mixing chamber and an inner portion of reduced diameter with a shoulder at the inner end of said third thread and forming a second inlet chamber communicating through a radially and angularly extending passage with the second of said inlet connections, a first valve seat disc threadedly engaged with the thread at the outer end of said mixing chamber and forming a central threaded aperture and fluid passages disposed around said threaded aperture, an operating valve stem threadedly engaged in the aperture in said first valve seat and having a shutoff valve on the inner end thereof cooperative with the inner face of said first valve seat, a sleeve positioned around the outer end of said stem and having a regulating valve flange cooperative with the outer face of said first valve seat, a second valve seat threadedly engaged with the threads at the inner end of said mixing chamber and forming a central valve stem guide with fluid passages disposed therearound, the outer face of said inner valve seat having wrench receiving recesses formed therein in the same pattern as the fluid passages in said first valve seat, a second valve stem slidably supported in the guide in said second valve seat and projecting therethrough to adjacent the inner end of said operating valve stem, a spring recessed into the inner end of said second valve stem and bearing against the inner end of said bore, a second shutoff valve on the inner end of said second valve stem cooperative with the inner face of said second valve seat, a packing plug in the outer end of said body, the inner face of said plug having an annular shouldered recess formed therein with an annular gasket retained in said recess and sealingly embracing said sleeve, the outer face of said plug having wrench receiving recesses formed therein in the same pattern as said first wrench receiving recesses, a handle axially clamped to the outer end of said operating stem and secured against rotation thereon, and a sealing gasket clamped between the inner end of said handle and the outer end of said sleeve around said operating stem.

3. A mixing valve comprising, a body having a bore formed therein closed at one end and opening to one face of the body, two fluid supply connections and a discharge connection formed on said body, said bore having an outer portion forming a first inlet chamber internally threaded at its outer end and communicating with one of said supply connections, said bore having a first reduced portion inwardly of said first chamber and internally threaded at its outer end and forming a mixing chamber, said bore further having an internal thread formed at the inner end of said mixing chamber and an inner portion of further reduced diameter at the end of said third thread and forming a second inlet chamber communicating with the second of said inlet connections, a first valve seat disc threadedly engaged with the thread at the outer end of said mixing chamber and forming a central threaded aperture and fluid passages disposed around said threaded aperture, an operating valve stem threadedly engaged in the aperture in said first valve seat and having a shutoff valve on the inner end thereof cooperative with the inner face of said first valve seat, a sleeve positioned around the outer end of said stem and having a regulating valve flange cooperative with the outer face of said first valve seat, a second valve seat threadedly engaged with the threads at the inner end of said mixing chamber and forming a central valve stem guide with fluid passages disposed therearound, the outer face of said inner valve seat having wrench receiving holes formed therein in a mating pattern with at least part of the fluid passages in said first valve seat, a second valve stem slidably supported in the guide in said second valve seat and projecting therethrough to adjacent the inner end of said operating valve stem, a spring recessed into the inner end of said second valve stem and bearing against the inner end of said bore, a second shutoff valve on the inner end of said second valve stem cooperative with the inner face of said second valve seat, a packing plug in the outer end of said body, the inner face of said plug having an annular recess formed therein with an annular gasket retained in said recess and sealingly embracing said sleeve, a handle axially clamped to the outer end of said operating stem and secured against rotation thereon, and a sealing gasket clamped between the inner end of said handle and the outer end of said sleeve around said operating stem.

4. A mixing valve comprising, a body having a bore formed therein closed at one end and opening to one face of the body, two fluid supply connections and a discharge connection formed on said body, said bore having an outer portion forming a first inlet chamber internally threaded at its outer end and communicating with one of said supply connections, said bore having a first reduced portion inwardly of said first chamber and internally threaded at its outer end and forming a mixing chamber, said bore further having an internal thread formed at the inner end of said mixing chamber and an inner portion at the end of said third thread and forming a second inlet chamber communicating with the second of said inlet connections, a first valve seat disc threadedly engaged with the thread at the outer end of said mixing chamber and forming a central threaded aperture and fluid passages disposed around said threaded aperture, an operating valve stem threadedly engaged in the aperture in said first valve seat and having a shutoff valve on the inner end thereof cooperative with the inner face of said first valve seat, a sleeve positioned around the outer end of said stem and having a regulating valve flange cooperative with the outer face of said first valve seat, a second valve seat threadedly engaged with the threads at the inner end of said mixing chamber and forming a central valve stem guide with a fluid passage disposed adjacent thereto, the outer face of said inner valve seat having wrench receiving holes formed therein in a mating pattern with at least part of the fluid passages in said first valve seat, a second valve stem slidably supported in the guide in said second valve seat and projecting therethrough to adjacent the inner end of said operating valve stem, a spring compressed between the inner end of said second valve stem and the inner end of said bore, a second shutoff valve on the inner end of said second valve stem cooperative with the inner face of said second valve seat, a packing plug in the outer end of said body, the inner face of said plug having an annular recess formed therein with an annular gasket retained in said recess and sealingly embracing said sleeve, a handle axially clamped to the outer end of said operating stem and secured against rotation thereon, and a sealing gasket clamped between the inner end of said handle and the outer end of said sleeve around said operating stem.

5. In a mixing valve for hot water and cold water, a cruciform body for said valve having supply and delivery connections formed in the arms thereof and having a central bore formed therein normal to the plane of said connections and opening to the front side of the body, spaced hot and cold valve seats having annularly arranged passages formed therethrough and threadingly engaged in said bore to form a mixing chamber therebetween and a hot water chamber at the inner end of the bore and a cold water chamber at the outer end of the bore, said seats and the wall of said bore having coacting conical sealing engagements, a hot water valve cooperative with the rear face of said hot water valve seat and having a stem supported by said hot water valve seat and projecting forwardly into said mixing chamber, a spring compressed between the body at the rear of said bore and a recess in said valve stem biasing said hot water valve to closed position, an operating valve stem positioned axially in said bore and threadedly engaged with said cold water valve seat and projecting therethrough, a sleeve positioned around said operating stem forwardly of the threads thereon, a cold water shutoff valve carried on the inner end of said operating stem within said mixing chamber and cooperative with the inner face of said cold water seat, a cold water regulating valve carried on said sleeve on the forward side of said cold water seat and movable axially with said operating stem to coact with said cold water seat in the extreme hot adjusted position of the valve, a packing threadedly engaged with the forward end of said body and sealingly embracing said sleeve, and a handle nonrotatably and axially secured on said stem and coacting with said sleeve to clamp the same axially on said stem.

6. In a mixing valve having angularly spaced hot water and cold water supply connections and a delivery connection, a body for said valve having a central bore formed therein normal to the plane of said connections and opening to the front side of the body, spaced hot and cold valve seats of different diameters threadingly engaged in said bore to form a mixing chamber therebetween and a hot water chamber at the inner end of the bore and a cold water chamber at the outer end of the bore, passages formed in said body and communicating between said chambers and their respective connections, a hot water valve cooperative with the rear face of said hot water valve seat and having a stem projecting forwardly into said mixing chamber, a spring received in a socket in the rear of said stem biasing said hot water valve to closed position, an operating valve stem positioned axially in said bore and threadedly engaged with said cold water valve seat and projecting therethrough, a cold water shutoff valve carried on the inner end of said operating stem within said mixing chamber and cooperative with the inner face of said cold water seat, a cold water regulating valve carred on said operating stem on the forward side of said cold water seat and movable axially with said operating stem to coact with said cold water seat in the extreme hot adjusted position of the valve, a packing threadedly engaged with the forward end of said body and sealingly embracing said operating stem, and a handle nonrotatably and axially fixed on said stem and coacting with said cold water regulating valve to clamp the same axially on said stem.

7. In a mixing valve having two fluid supply connections and a delivery connection, a body for said valve having a bore formed therein and opening to the front side of the body, axially spaced first and second valve seats of different diameters threadingly engaged in said bore to form a mixing chamber therebetween and a first fluid chamber at the inner end of the bore and a second fluid chamber at the outer end of the bore, said fluid chambers communicating with said supply connection and said mixing chamber communicating with said delivery connection, a first valve cooperative with the rear face of said first valve seat and having a stem projecting forwardly into said mixing chamber, a spring biasing said first valve to closed position, an operating valve stem positioned axially in said bore and threadedly engaged with said second valve seat and projecting therethrough, a second valve carried on the inner end of said operating stem within said mixing chamber and cooperative with the inner face of said second seat, a third regulating valve carried on said operating stem on the forward side of said second seat and movable axially with said operating stem to coact with the outer side of said second seat in inwardly adjusted positions of the operating valve stem, said valve stems being axially engageable to unseat said first valve after opening of said second valve, a packing threadedly engaged with the forward end of said body and sealingly embracing said operating stem, and a handle nonrotatably and axially fixed on said operating stem and coacting with said third regulating valve to clamp the same axially on said stem.

8. In a mixing valve having two fluid supply connections and a delivery connection, a body for said valve having a bore formed therein and opening to the front side of the body, axially spaced first and second valve seats of different diameters threadingly engaged in said bore to form a mixing chamber therebetween and a first fluid chamber at the inner end of the bore and a second fluid chamber at the outer end of the bore, said fluid chambers communicating with said supply connection and said mixing chamber communicating with said delivery connection, a first valve cooperative with the rear face of said first valve seat and having a stem projecting forwardly into said mixing chamber, a spring biasing said first valve to closed position, an operating valve stem positioned axially in said bore and projecting through said second valve seat, a second valve carried on the inner end of said operating stem within said mixing chamber and cooperative with the inner face of said second seat, a third regulating valve carried on said operating stem on the forward side of said second seat and movable axially with said operating stem to coact with the outer side of said second seat in inwardly adjusted positions of the operating valve stem, said valve stems being axially engageable to unseat said first valve after opening of said second valve, a packing threadedly engaged with the forward end of said body and sealingly embracing said operating stem, and a handle nonrotatably fixed on said operating stem.

9. In a mixing valve, an operating valve stem having an outwardly facing valve element secured to its inner end, a threaded portion on said stem located outwardly of said valve element, a sleeve positioned around said stem and abutting against the outer end of said threaded portion, a regulating valve flange on the inner end of said sleeve and opposed to said inner valve element, a handle nonrotatably secured to the outer end of said stem, a gasket positioned between the inner end of said handle and the outer end of said sleeve and around said stem, and means axially clamping said handle to said stem to compress said handle against said gasket and said sleeve.

10. In a mixing valve, an operating valve stem having an outwardly facing valve element on its inner end, a threaded portion on said stem located outwardly of said valve element, a regulating valve positioned around said stem at the outer end of said threaded portion, a handle nonrotatably secured to the outer end of said stem, a gasket positioned between the inner end of said handle and the outer end of said regulating valve and around said stem, and means axially clamping said handle to said stem to compress said handle against said gasket and said regulating valve.

11. In a mixing valve, an operating valve stem having an outwardly facing valve element on its inner end, a threaded portion on said stem located outwardly of said valve element, a regulating valve positioned around said stem at the outer end of said threaded portion, and a handle nonrotatably secured to the outer end of said stem and axially clamping said regulating valve thereon.

12. In a mixing valve having a body with an open ended recess therein, a combined valve stem nut and valve seat threadedly engaged with said body intermediate of the ends of said recess to divide the same into separate chambers, said nut and seat having a central threaded valve stem aperture formed therethrough and a plurality of fluid passages formed therethrough and disposed in an annular series adjacent to said aperture, and an annular rib on said nut and seat surrounding said passages and constituting a valve abutment.

13. In a mixing valve having a body with an open ended recess therein, a combined valve stem nut and valve seat threadedly engaged with said body intermediate of the ends of said recess to divide the same into separate chambers, said nut and seat having a threaded valve stem aperture formed therethrough and a fluid passage formed therethrough and disposed adjacent to said aperture.

HUGHLIN E. KLINGLER.

References Cited in the file of this patent

UNITED STATES PATENTS

| Number | Name | Date |
|---|---|---|
| Re. 20,836 | Wall | Aug. 30, 1938 |
| 551,473 | Perkins | Dec. 17, 1895 |
| 1,502,021 | De Francisco | July 22, 1924 |
| 1,555,412 | Gorton | Sept. 29, 1925 |
| 1,805,158 | Bacon | May 12, 1931 |
| 2,308,408 | Wall | Jan. 12, 1943 |
| 2,519,158 | Syommons | Aug. 15, 1950 |